Sept. 10, 1929. C. R. PATON 1,727,378
STEERING MECHANISM
Filed Nov. 4, 1926  2 Sheets-Sheet 1
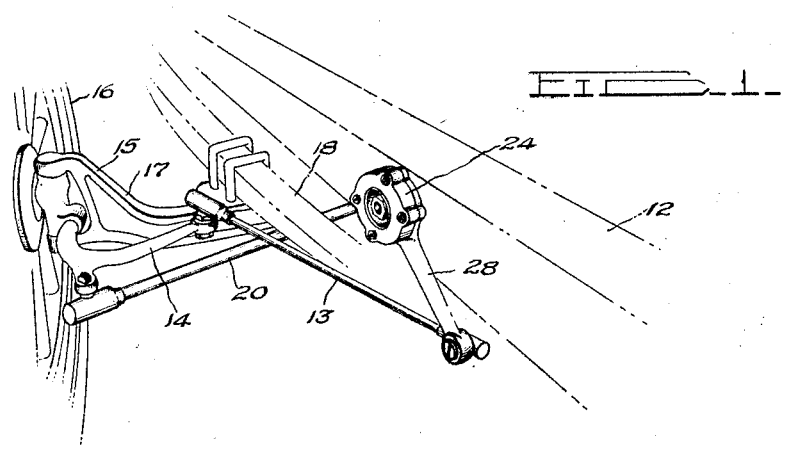
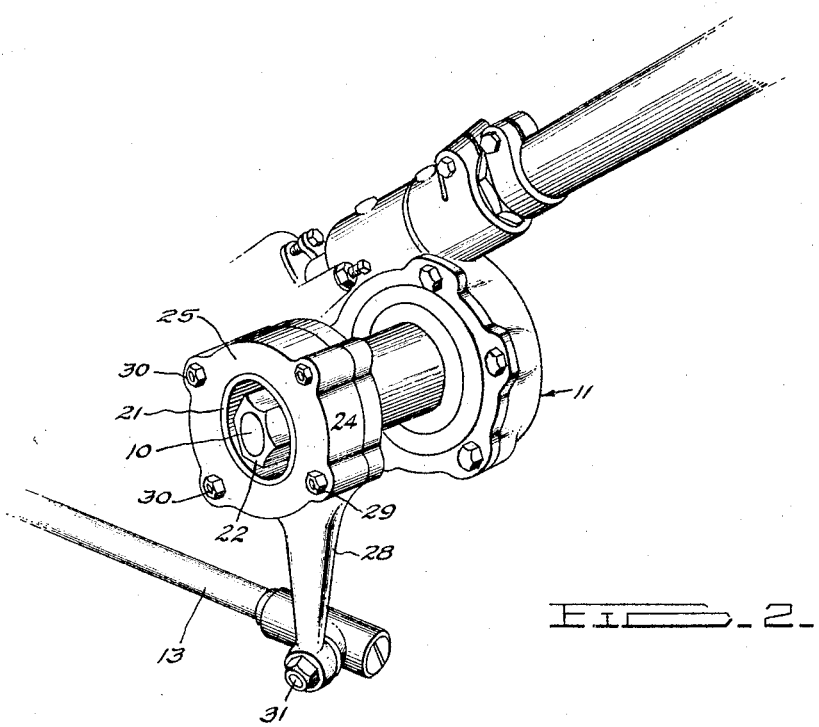
INVENTOR
Clyde R. Paton
BY
ATTORNEY

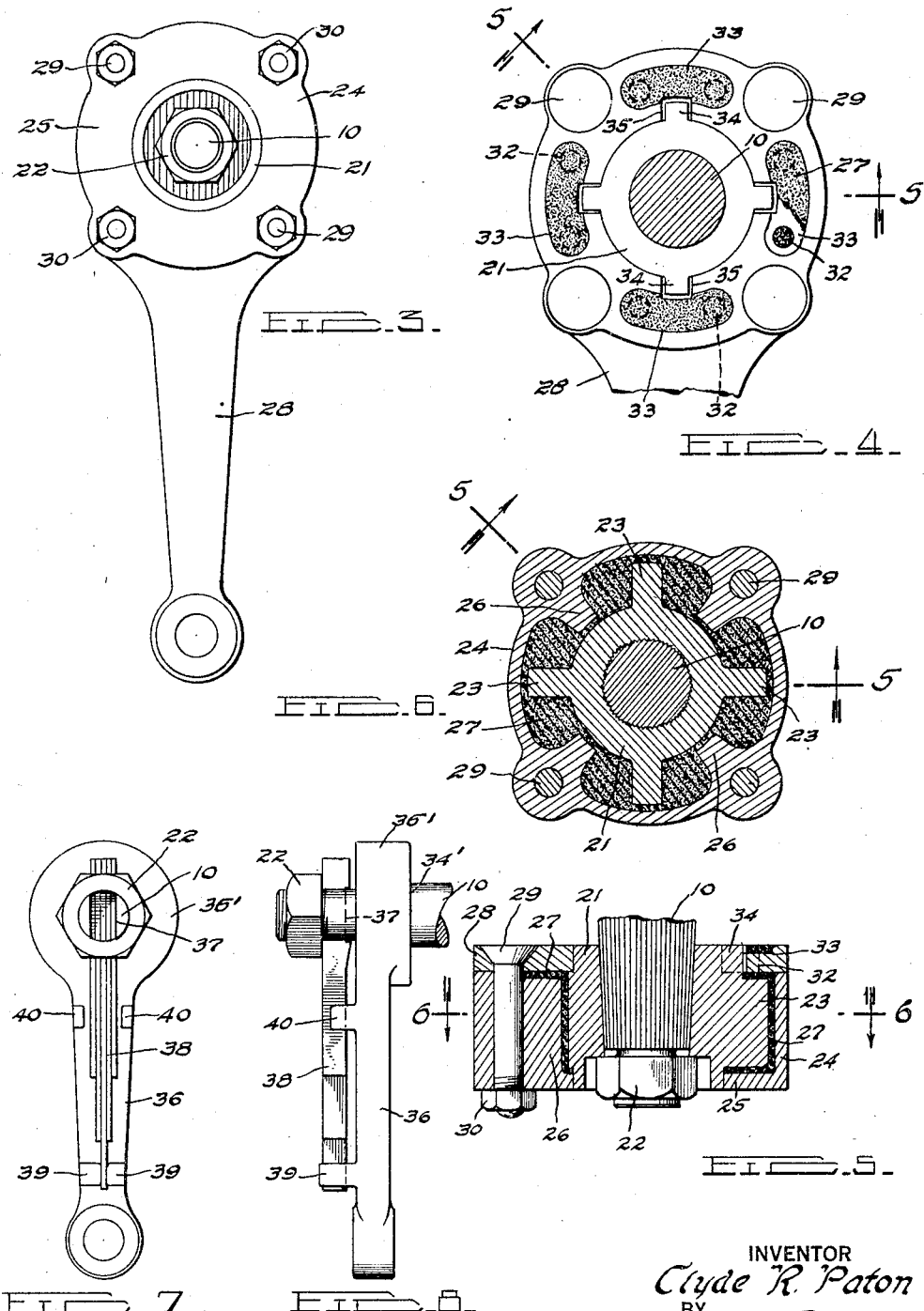

Patented Sept. 10, 1929.

1,727,378

UNITED STATES PATENT OFFICE.

CLYDE R. PATON, BIRMINGHAM, MICHIGAN, ASSIGNOR TO THE STUDEBAKER CORPORATION, OF SOUTH BEND, INDIANA, A CORPORATION OF NEW JERSEY.

STEERING MECHANISM.

Application filed November 4, 1926. Serial No. 146,151.

This invention relates to the steering mechanism of motor vehicles, and particularly to the steering arm construction thereof, the principal object being to provide a steering arm having a cushioning action, whereby movement of the front axle and parts carried thereby, which act to move the steering arm, will be allowed to move the same within a limited range without transmitting the full force thereof to the steering gear and consequently to the steering wheel.

Another object is to provide a steering arm for a motor vehicle in which the forces transmitted to the free end of the arm are in turn transmitted to the supporting shaft through a cushioning means.

Another object is to provide a steering arm construction in which the steering arm is secured to turn with its shaft through a resilient connection.

Another object is to provide a steering arm construction in which the steering arm is resiliently connected to its shaft so as to be capable of a limited rotary movement relative thereto, in combination with positive means for limiting such relative movement.

A further object is to provide a steering arm comprising two main portions, a hub portion and an arm portion, the hub portion adapted to be immovably secured to a supporting shaft and provided with a plurality of outwardly projecting splines, the arm portion being provided with an end portion encircling the hub portion and having inwardly projecting splines extending between but out of contact with the splines on the hub, a resilient material such as rubber being interposed between the splines of the hub portion and the splines of the arm portion whereby the arm portion is capable of a relative rotary movement about the hub portion within the range of deformation of the resilient material, and means being provided between the hub portion and the arm portion for positively limiting the amount of relative rotary movement between the same.

The above being among the objects of the present invention, the same consists of certain features of construction and combinations of parts to be hereinafter described with reference to the accompanying drawings, and then claimed, having the above and other objects in view.

In the accompanying drawings which show suitable embodiments of the present invention, and in which like numerals refer to like parts throughout the several different views, Figure 1 is a fragmentary perspective view of a portion of an automobile chassis showing the relative location of a steering arm embodying the present invention in respect to the front axle and parts co-operating therewith.

Figure 2 is a fragmentary perspective view of the lower end of a steering gear, showing the application of the steering arm shown in Figure 1 thereto.

Figure 3 is an elevation of the front face of the steering arm shown in Figures 1 and 2.

Figure 4 is an elevation of the rear face of the upper end of the steering arm shown in the previous views.

Figure 5 is a sectional view taken on the line 5—5 of Figure 4, and also corresponds to a section taken on the line 5—5 of Figure 6.

Figure 6 is a sectional view taken on the line 6—6 of Figure 5.

Figure 7 is an elevation of the front face of a modified construction of a steering arm built in accordance with the present invention.

Figure 8 is a side elevation of the steering arm of Figure 7.

In automobile constructions it is the usual practice to so design the steering mechanism that the steering wheels pivot about a line which, if extended to the ground, would strike the ground at a point inwardly from the center of contact of the corresponding wheel with the ground. Due to this fact, if, while the vehicle is in motion, one of the steering wheels strikes an obstruction in the road, a force is set up which tends to cause rotation of the wheel about its king pin. This force is transmitted through the steering knuckle to the steering arm, through the cross-rod in case the obstruction strikes the wheel opposite to the knuckle carrying the drag-link, through the drag-link to the steering arm and thence through the steering gear to the steering wheel where its effect is felt by the driver of the automobile. This effect is commonly known as road shock and is particularly evident where steering gears of the so-called "reversible" type are used. This is one effect, or more correctly, one disadvantage, that the present invention contemplates eliminating to a great extent.

Where the conventional semi-elliptical front springs are employed on automobiles, and are shackled at the rear ends thereof and pivoted against longitudinal movement at the front ends, when the springs are depressed they flatten out, with the result that the point on the spring to which the front axle is secured, is caused to move rearwardly in respect to the fixed front end of the springs. In such case, if the driver holds the steering wheel from turning so that the lower end of the steering arm does not move, as the axle moves back, carrying with it the steering knuckle to which the drag link arm is secured, the drag link tends to hold the free end of the drag link arm at a constant distance from the free end of the steering arm and a rotary movement is imparted to the steering knuckles about their king pins. This condition aggravates a shimmying condition of the steering mechanism, particularly when traveling over rough roads which cause repeated depressions of the springs.

Again, when such springs flatten out, they do not usually flatten out in a straight line but tend to bend into an ogee or reversed curve, which tends to turn the axle about a line parallel to its length. This movement tends to cause a forward or rearward movement of the free end of the drag link arm which, if restrained, tends to cause rotation of the steering knuckle about its king pin as previously described, which aggravates shimmying.

Another such effect occurs when the front axle is suddenly displaced relatively to its length, such as happens during shimmying, and which, because of the unbalanced conditions of the parts carried by the front axle and movable in respect thereto, forwardly and rearwardly of the axle, tends to cause rotation of the steering knuckles, with the same aggravation if the free end of the steering arm is held to resist such movement.

The above and other causes which materially increase the shimmying tendencies of a particular construction when the steering arm is restrained against movement, may in constructions using a full reversible or semi-reversible type of steering gear, be materially reduced if the driver lets go of the steering wheel, or grasps it so lightly that it may turn back and forth, so that the steering arm is freely movable by the different movements of the axle. In the full irreversible types of steering gears the releasing of the steering wheel would, of course, have no such effect, and as it is natural for an ordinary driver to hold his steering wheel against movement, the releasing of the wheel can never become a practical solution of the problem even in cases where a full reversible type of steering gear is used.

The present invention provides a construction which not only eliminates to a great extent, the effect of the road shock being felt by the driver through the steering wheel, but also allows a sufficient amount of movement of the free end of the steering arm, without a corresponding movement of the steering wheel, to eliminate a great amount of the rotary movement imparted to the steering knuckles because of axle movement, thereby preventing an aggravation of the conditions which help to cause shimmying and in effect reducing the shimmying action itself. This is accomplished by providing a resilient connection between the steering arm and the steering gear shaft, whereby the arm is permitted to move, within certain limits, independently of the shaft upon which it is supported, such movement being cushioned and means being preferably provided for positively limiting the amount of relative movement between the parts.

In Figures 1 to 6 inclusive of the accompanying drawings, I show a preferable embodiment of the present invention in which the steering arm is restrained for movement with the steering gear shaft through a resilient means which allows a limited relative movement of the arm in respect to the shaft. As shown in Figures 1 and 2, the steering arm embodying the present invention is employed in the same way as in conventional constructions, it being secured to the outer end of the shaft 10 of the steering gear 11 which is in turn supported by the chassis frame side rail 12. The free end of the steering arm is connected by a conventional drag link 13 to the free end of the lever 14 secured to the steering knuckle 15 whereby to control the pivotal position of the same, and consequently the wheel 16, in respect to the front axle 17 which is connected to the frame 12 by conventional springs 18. The front wheels 16 are connected together to turn in unison by a conventional drag link 20.

The steering arm comprises in part a hub 21 which is secured to the tapered outer end of the steering gear shaft 10 by the nut 22, the co-acting surface of the shaft 10 being serrated to better prevent movement of the hub 21 thereon. The hub 21 is provided with four equally spaced radially extending splines 23 between and spaced from the end surfaces thereof. Surrounding the hub 21 and splines 23 is the casing 24 which is provided with an end wall 25 which is piloted on the forward end of the hub 21 outwardly of the splines 23. The inner walls of the casing 24 and end wall 25 are spaced from the outer edges of the splines 23, and four radially projecting splines 26 extend inwardly from the inner walls of the casing 24 to a point adjacent but spaced from the hub 21, each spline 26 being positioned midway between a pair of the splines 23. The space between the hub 21 and casing 24, and between the splines 23 and 26, is filled with a resilient material 27 such as rubber. The steering arm 28 is provided with an enlarged hub end which is piloted on the rear end of the hub 21 and which serves as a cover or cap for the open end of the casing 24, it being secured thereto by a plurality of bolts 29 which pass through both the arm 28 and casing 24 and are secured in place by the nuts 30, thereby immovably securing the arm 28 to the casing 24. The lower end of the arm 28 terminates in the conventional apertured end formed to receive a conventional ball ended member 31.

In practice I prefer to assemble the hub 21, casing 24 and arm 28 in proper relative position to each other without the rubber 27 and then force the rubber 27 through openings 32 provided in the enlarged hub portion of the lever 28 in line with each space between the respective splines 23 and 26, until the whole space within the casing is completely filled and the rubber is vulcanized to the metallic surfaces therein. For this purpose it is preferable to connect each pair of openings 32 by a shallow trough 33 to provide an overflow for the rubber as it is being forced into the openings 32.

In order to provide a positive stop for limiting the amount which the arm 28 may move relative to the hub 21, I prefer to extend the splines 23 to the inner edge of the hub 21, they being reduced in depth from a plane inside of the plane of the inner face of the casing 24 to such inner edge, to provide key-like projections 34, and providing slots 35 in the arm 28 in matching relation with the keys or projections 34 whereby to receive the same, the slots 35 being of sufficiently greater width than the keys 34 so that the normal movement between the hub 21 and arm 28 is unrestricted except by the cushioning effect of the rubber 27, but when an unusual force is exerted on the hub 21 to turn the arm 28, such as is required when turning the wheels while standing, pulling out from curbs or ruts, and for a greater factor of safety, the sides of the slots 35 will be engaged by such keys 34 and positive movement of the arm 28 in respect to the hub 21 will thereafter follow until such force drops back to normal.

The action of the construction will be readily apparent. If the wheel 16 while moving is momentarily retarded by striking an obstruction in the road, it will tend to momentarily swing back, turning the knuckle 15 and moving the inner end of the arm 14 forward. As the inner end of the arm 14 moves forward it will carry the drag link 13 and the free end of the steering arm 28 with it, but due to the resilient material 27 which connects the arm 28 to the hub 21, the arm 28 will be allowed to follow this movement of the drag link 13 without materially affecting the position of the hub 21 and consequently the steering wheel (not shown), unless the shock be an unusual one, and in any case the force of the shock will be materially cushioned. If any of the previously described movements of the front axle 17 occur, such as are due to the deflection of the springs 18 or endwise movement of the axle 17, which in turn tend to vary the position of the inner end of the arm 14, the arm 28 will give sufficiently with respect to its hub 21 to allow the inner end of the arm 14 to follow this movement and consequently a rotary movement will not be imparted to the steering knuckle 15 such as would occur if such end of the arm 14 was held against movement.

In Figures 7 and 8 a modified form of construction is shown, in which the outer end of the shaft 10 is slightly reduced in diameter to form a shoulder 34', and that part of the shaft 10 projecting outwardly therefrom is cylindrical in shape and rotatably receives the hub 36' of the steering arm 36 thereon against the shoulder 34'. The end of the shaft 10 outside of the hub 36' is slotted as at 37 and receives therein one end of a multiple leaf spring 38 which is clamped against movement against the bottom of the slot 37 by the nut 22. The opposite end of the spring 38, which at its extreme end is reduced to but a single thickness, is received between two abutments 39 formed near the free end of the arm 36. The arm 36 is thus constrained to move with the shaft 10 by the spring 38 which will give sufficiently to allow the arm 36 to have a small amount of rotational movement in respect to the shaft 10 in much the same manner as the arm 28 is allowed a relative movement in respect to the hub 21 in the construction first explained. In order to limit the amount of relative movement thus permitted between the shaft 10 and arm 36, two stops 40 are provided on the arm 36 between the stops 39 and the shaft 10, the stops 40 being normally spaced from the sides of the spring 38 and are adapted to contact with the stiffer portion thereof when the spring 38 has been sprung a predetermined amount, and after the spring 38 has been sprung such amount the arm 36 is thereafter constrained to positive movement with the shaft 10 during a further continued movement in the same direction.

Formal changes may be made in the specific embodiments of the invention described without departing from the spirit and substance of the broad invention, the scope of which is commensurate with the appended claims.

What I claim is:

1. In an automobile steering mechanism, a shaft, a steering arm mounted thereon for rotatable movement in respect thereto, and a laminated leaf spring including a master leaf and opposed supplemental leaves, secured to said shaft extending parallel with and engaging said arm, intermediate the ends of said arm, for moving said arm with said shaft, said spring tending to flex to allow limited rotational movement between said arm and said shaft.

2. In a steering mechanism for a motor vehicle, a steering arm, a shaft therefor, a flat spring member secured to said shaft for engaging said arm to permit limited rotation between said arm and said shaft, and a pair of spaced lugs on said arm spaced from said spring member adapted to engage therewith upon rotation of said shaft for limiting said limited rotation between said shaft and said arm.

3. In a steering mechanism for motor vehicles, a steering arm having spaced lugs thereon, a rotatable shaft therefor having a threaded end provided with a slot, a leaf spring fitted at one end in said slot and received at the other end between said lugs on said arm, a nut threaded on said shaft for securing said spring thereto, and a pair of spaced lugs on said arm spaced from the sides of said spring, said spring permitting limited rotational movement between said shaft and said arm, and said last-mentioned pair of lugs limiting said limited rotational movement.

4. In an automobile steering mechanism, a shaft, a steering arm mounted on said shaft, for rotatable movement in respect thereto, and a laminated leaf spring comprising a master leaf and supplemental leaves on either side thereof, said leaves being secured at one end to said shaft at the approximate end thereof and extending parallel with said arm tending to move said arm with said shaft.

Signed by me at Detroit, Michigan this 29th day of October 1926.

CLYDE R. PATON.